United States Patent [19]

Malecha

[11] 4,295,541
[45] Oct. 20, 1981

[54] APPARATUS FOR SUPPORTING LOADS

[75] Inventor: Richard J. Malecha, St. Louis Park, Minn.

[73] Assignee: Towmotor Corporation, Mentor, Ohio

[21] Appl. No.: 89,116

[22] PCT Filed: May 14, 1979

[86] PCT No.: PCT/US79/00321
§ 371 Date: May 14, 1979
§ 102(e) Date: May 14, 1979

[87] PCT Pub. No.: WO80/02550
PCT Pub. Date: Nov. 27, 1980

[51] Int. Cl.³ .............................................. G05G 1/14
[52] U.S. Cl. ....................................... 180/315; 74/512; 414/635
[58] Field of Search ................ 180/315, 336, 335; 74/512; 414/635; 636

[56] References Cited
U.S. PATENT DOCUMENTS 1,469,258 10/1923 Geistert ................................ 74/512
1,510,315 9/1924 Fuller .................................... 74/512
2,381,729 8/1945 Dunham .............................. 414/635
4,060,144 11/1977 Teti ................................ 180/77 MC

FOREIGN PATENT DOCUMENTS 2006442 4/1969 France ................................. 414/635

Primary Examiner—John P. Silverstrim
Attorney, Agent, or Firm—Phillips, Moore, Weissenberger, Lempio & Majestic

[57] ABSTRACT

The invention relates to apparatus (10) for supporting in common loads including a brake pedal (14) and tilt cylinder (16), as well as for mounting a brake master cylinder (42). The invention overcomes problems in isolating one load from another and in conveniently mounting the master cylinder. The apparatus (10) includes a frame (12), a bifurcated bracket (20) having ears (24,26) and being coupled to the frame (12), an elongated sleeve (52 or 60 or 62) supported on the ears (24,26) and an elongated cross pin (32) rotatably supported in the ears (24,26). The brake pedal (14) is coupled to one end of the pin (32) and the cylinder (16) is coupled to the sleeve (52 or 60 or 62) between the ears (24,26), both inside an inboard side of the frame (12). The master cylinder (42) is mounted on an outboard side of the frame (12) and is coupled to the other end of the pin (32).

9 Claims, 4 Drawing Figures

APPARATUS FOR SUPPORTING LOADS

DESCRIPTION

Technical Field

This invention relates to apparatus for supporting a plurality of loads and, more particularly, to apparatus for commonly anchoring and isolating one load from another load.

Background Art

Many systems have a plurality of loads that are supported on a common frame. For example, in vehicles such as fork lift trucks, a load member such as a brake pedal is mounted at one location of the frame and another load member, such as a tilt cylinder for tilting a lift carriage, is mounted at another location of the frame. Consequently, with these different mounting locations one load is easily isolated from the other load. Thus, for example, when the brake pedal is depressed the load of the tilt cylinder will not affect the braking action.

A patent application entitled "Apparatus for Mounting a Plurality of Members," by Richard J. Malecha, the inventor of the present invention, has been filed on the same date as this application and is assigned to the same assignee. Disclosed in such patent application are at least two load members that are mounted in common at the same location of a frame. More particularly, such patent application describes, among other things, a brake pedal and a tilt cylinder that are mounted in common on the frame. The reasons for and advantages of this common mounting are described in such patent application and need not be considered here.

Once the idea was conceived by the inventor of commonly mounting the above two load members, a particular problem arose. That is, unless properly mounted in common, each of the load members might affect the other of the load members. For example, since the brake pedal and tilt cylinder are mounted in common, the braking action could be affected by the tilt cylinder.

In addition, vehicles, such as fork lift trucks, are becoming more and more complex due to the additional or optional features that can be included on the truck. For example, trucks can be equipped with torque converter transmissions and creeper control valves rather than with standard transmissions. The former require more space than the latter and, therefore, reduce the available given space for all the components in the engine compartment.

As the available space for these components of the vehicle is reduced, problems arise in the positioning of them. For example, those components which require frequent maintenance or which should be checked often should be mounted on a frame for easy and quick access to them. Otherwise, the time and cost for repair or maintenance of these components would increase substantially. One example of such a component is the master brake cylinder of the vehicle which typically is mounted inside of the vehicle frame.

DISCLOSURE OF THE INVENTION

The present invention is directed to overcoming one or more of the problems as set forth above.

In one aspect of the present invention, apparatus is provided for supporting loads, including a first load member, a second load member, a frame, and means for anchoring the first load member and the second load member to the frame and for isolating the load of the first load member and the load of the second load member from one another.

In another aspect of the present invention, apparatus is provided for controlling a vehicle, including a frame having an inboard side and an outboard side, a brake master cylinder mounted on the outboard side, means for actuating the brake master cylinder, the actuating means being positioned inside the inboard side and means for connecting the master cylinder and the actuating means.

With the present invention, at least two loads can be mounted in common at one location of a frame and be isolated from one another. This has the advantage of preventing either of the loads from affecting the other load. Furthermore, at least one of the loads such as a brake pedal can be coupled to the inside of the frame and a brake master cylinder operated by the brake pedal can be mounted on the outboard side of the frame for ease of access.

BEST MODE FOR CARRYING OUT THE INVENTION

Figure 1:
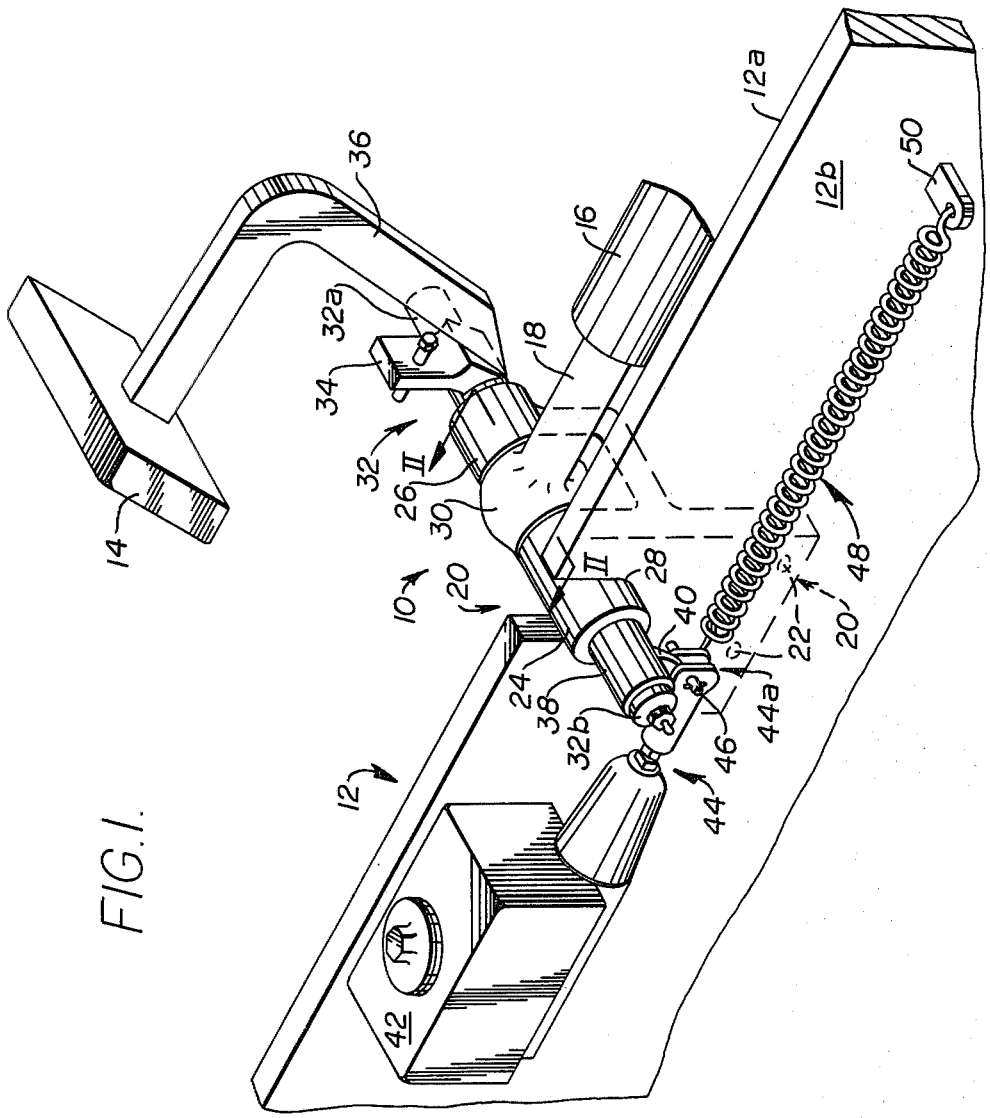
FIG. 1 is a view in perspective of an embodiment of the invention.

FIG. 1 shows apparatus 10 for supporting a plurality of load members on a vehicle main frame 12. One load member can be, for exaple, a brake pedal 14 and the other load member can be, for example, a tilt cylinder 16 having a cylinder rod 18. The brake pedal 14 and tilt cylinder 16 can be part of a vehicle such as a fork lift truck which has a conventional mast and lift carriage assembly (not shown) that can be tilted by operating the tilt cylinder 16.

A bifurcated bracket 20, shown generally in FIG. 1, and more specifically in the other figures, is mounted at one side 12a, i.e., the inboard side, of the frame 12 by bolt assemblies 22. Bracket 20 has spaced apart hollow ears 24 and 26, with ear 24 extending through a U-shaped slot 28 of the frame 12. A rod eye 30 is supported between the ear 24 and ear 26 and is part of the rod 18.

A cross pin 32 extends through the ear 24, the ear 26 and the rod eye 30. A bar 34 is connected to one end 32a of the cross pin 32 by welding, pinning, etc. The pedal 14 is coupled to the bar 34 by a lever 36. As will be further described, cross pin 32 is rotatably supported in relation to the rod eye 30. Therefore, the brake pedal 14 can be depressed to rotate the cross pin 32 in relation to the rod eye 30 or the tilt cylinder 16 can be rotated about and in relation to the cross pin 32.

Cross pin 32 has another end 32b which extends to the other or outboard side 12b of the frame 12. A sleeve 38, which is keyed to the end 32b to rotate with the pin 32, has a depending ear 40.

A brake master cylinder 42 is mounted on the outboard side 12b of the frame 12. Master cylinder 42 has a piston rod and lever assembly 44, shown generally in FIG. 1, with a bifurcated end 44a between which the depending ear 40 extends. A pin 46 extends through the bifurcated end 44a and depending ear 40 to couple the assembly 44 to the sleeve 38. A spring 48 is disposed between the end 44a and a bracket 50 connected to the side 12b to bias the assembly 44 to the position shown. Thus, upon depressing the pedal 14, the cross pin 32 will rotate in a clockwise direction as shown in FIG. 1 to move the assembly 44 inwardly of the master cylinder 42 against the bias of the spring 48 to actuate the vehicle brakes (not shown). Upon release of the pedal 14, the spring 48 will return the assembly 44 and brake pedal 14 to the positions shown.

Figure 2:
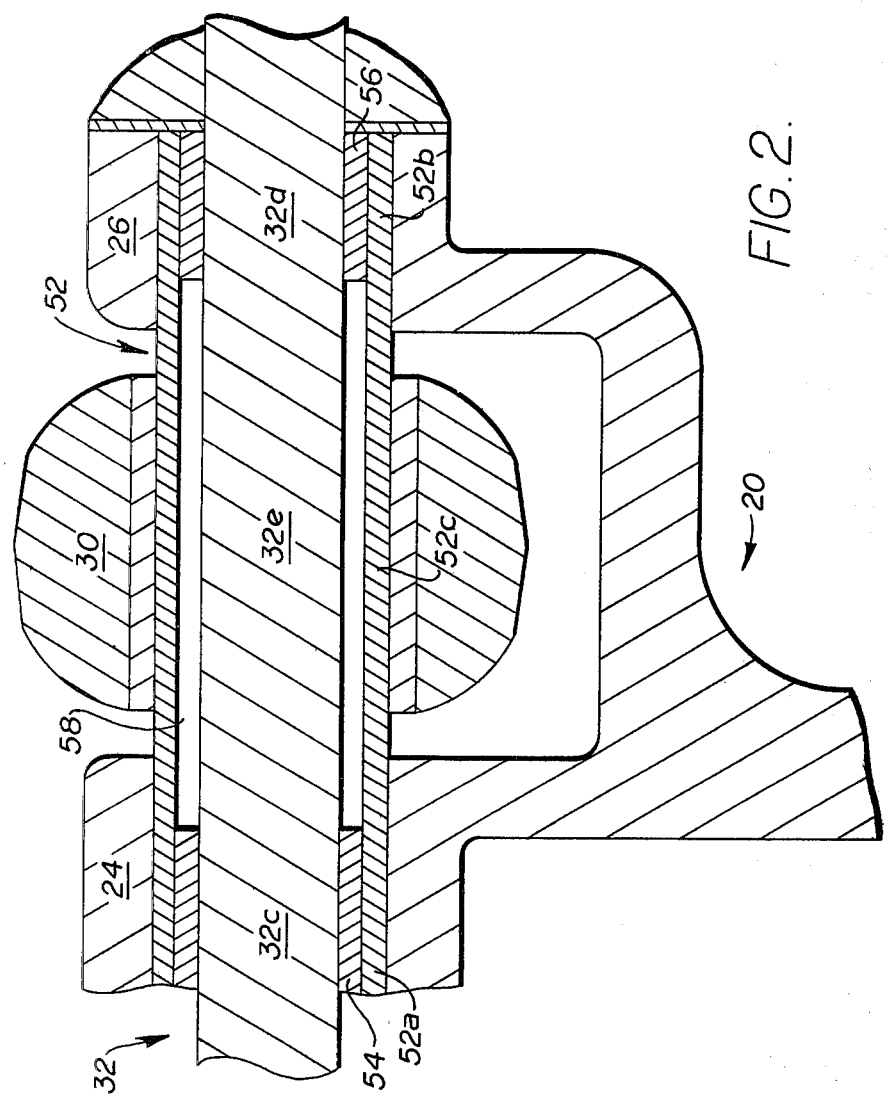
FIG. 2 is a cross-section of a specific embodiment taken along lines 2—2 of FIG. 1.

FIG. 2 shows in more detail the bifurcated bracket 20 and the spaced apart ears 24 and 26. An elongated sleeve 52 extends across the bracket 20 within the ear 24 and the ear 26. The sleeve 52 has an outside diameter so as to have one end 52a and another end 52b fixedly supported within the interior of the ear 24 and ear 26, respectively. A bearing 54, such as a sleeve bearing, is mounted within the sleeve end 52a in the ear 24. A bearing 56, such as a sleeve bearing, is mounted within the sleeve end 52b in the ear 26. The cross pin 32 extends through the bearing 54 and bearing 56 and is rotatably supported by these bearings 54 and 56 by pin portions 32c and 32d, respectively. As also shown in FIG. 2, the rod eye 30 is rotatably supported on the sleeve 52 at a sleeve mid-portion 52c in the space between the ear 24 and ear 26.

The sleeve 52 has an inner diameter and the cross pin 32 has an outer diameter such that a space 58 is provided between the mid-portion 52c of sleeve 52 and a mid-portion 32e of pin 32. The tilt cylinder 16 provides a load that will cause the rod eye 30 to deflect the sleeve 52 at its mid-portion 52c between the ear 24 and ear 26. The load on the sleeve 52 is then transferred to its ends 52a,52b where it is supported, respectively, on the ears 24 and 26. The spacing 58 is such that the mid-portion 52c of the sleeve 52 will not deflect into contact with the mid-portion 32e of the cross pin 32, whereby the tilt cylinder load is not transferred to the pin 32.

The load provided by the brake pedal 14 is transferred through the lever 36 and bar 34 to the cross pin 32. This load is then transferred from the portions 32c and 32d of cross pin 32 to the respective bearings 54 and 56, and then through the sleeve ends 52a and 52b to the ear 24 and ear 26. Thus, the load of the brake pedal 14 is not transferred to the rod eye 30 and the tilt cylinder 16. Consequently, the loads of the brake pedal 14 and the tilt cylinder 16 are isolated one from the other.

Figure 3:
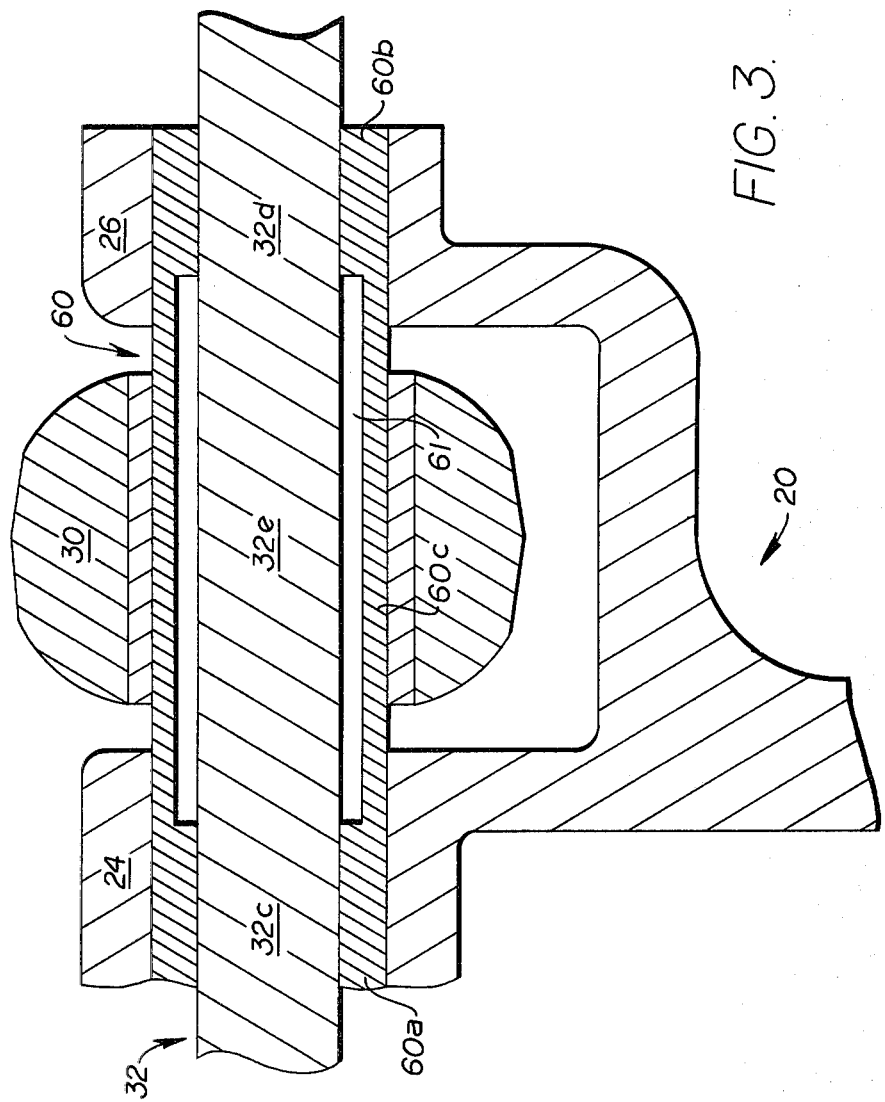
FIG. 3 is a view in cross-section of an alternative specific embodiment taken along lines 2—2 of FIG. 1.

FIG. 3 also shows the bracket 20 with the ear 24 and ear 26, as well as the rod eye 30 and cross pin 32. In this embodiment, an elongated sleeve 60 also has an outside diameter such that it is fixedly supported on the ear 24 and ear 26 at respective sleeve ends 60a and 60b. Sleeve 60 has a mid-portion 60c on which the rod eye 30 is mounted. The sleeve ends 60a and 60b are wider than mid-portion 60c and provide bearing surfaces for the cross pin portions 32c and 32d. The sleeve 60 and cross pin 32 are constructed to provide a space 61 between the mid-portion 60c of the sleeve 60 and the mid-portion 32e of the cross pin 32.

As the rod eye deflects the mid-portion 60c, the load of the tilt cylinder 16 will be transferred through the rod eye 30 and the mid-portion 60c to the respective ear 24 or 26 via the sleeve ends 60a and 60b. The spacing 61 is such that the mid-portion 60c, when deflected, will not contact the cross pin mid-portion 32e so as to prevent loading of the cross pin 32 by the cylinder 16. Also, the cross pin 32 is rotatably supported at the sleeve ends 60a and 60b so that the load of the brake pedal 14 is transferred through the lever 36, the bar 34, the cross pin portions 32c and 32d, and the respective sleeve ends 60a and 60b to the respective ears 24 and 26. Thus, the loads of the brake pedal 14 and tilt cylinder 16 are isolated from one another in this embodiment.

Figure 4:
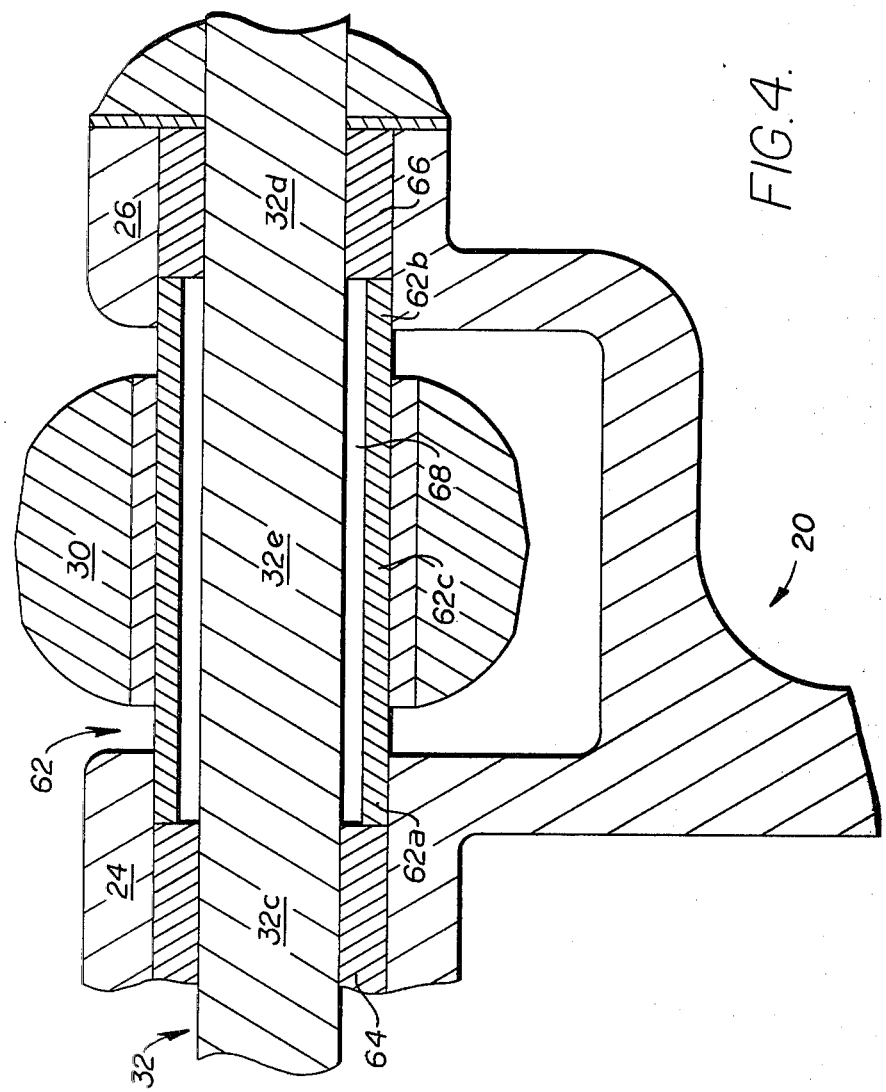
FIG. 4 is a cross-section of yet another specific embodiment taken along lines 2—2 of FIG. 1.

FIG. 4 also shows the bracket 20 with the ear 24 and ear 26, as well as the rod eye 30 and cross pin 32. In this embodiment, an elongated sleeve 62 has an end 62a, an end 62b, and a mid-portion 62c, with these two ends 62a and 62b extending partially within and being fixedly supported on the ears 24 and 26, respectively. A bearing 64, such as a sleeve bearing, has a smaller inner diameter than the sleeve 62 and is supported within the ear 24 adjacent the sleeve end 62a. A bearing 66, such as a sleeve bearing, has a smaller inner diameter than the sleeve 62 and is supported within the ear 26 adjacent the sleeve end 62b. Pin portions 32c and 32d rotate on the bearings 64 and 66.

The sleeve 62, the bearings 64 and 66, and the cross pin 32 are constructed so as to provide a spacing 68 between the mid-portion 62c of the sleeve 62 and the mid-portion 32e of the pin 32. Thus, when the rod eye 30 deflects the mid-portion 62c due to the loading by the tilt cylinder 16, the sleeve 62 will not come into contact with the pin 32. The load provided by the tilt cylinder 16 is transferred through the rod eye 30 and the mid-portion 62c to the ends 62a and 62b and then to the ear 24 and the ear 26. The loading provided by the brake pedal 14 is transferred through the lever 36, bar 34 and cross pin 32 to the respective bearings 64 and 66 to the ears 24 and 26. Thus, in this embodiment also the loads of the brake pedal 14 and tilt cylinder 16 are isolated from one another.

Industrial Applicability

As already indicated, the apparatus 10 can be employed on a vehicle such as a fork lift truck. The brake pedal 14 and the tilt cylinder 16 are mounted or anchored in common by the apparatus 10 at one location of the frame 12. The pedal 14 and tilt cylinder 16 are mounted from inside the inboard side 12a of the frame 12 and the master cylinder 42 is mounted on the outboard side 12b of the frame 12.

As the brake pedal 14 is depressed, the cross pin 32, in all the embodiments shown, will rotate on the bearings of FIG. 2 or FIG. 3 or FIG. 4 to rotate also the sleeve 38 fixed to the end 32b of the pin 32. Therefore, the piston rod and assembly 44 will be moved to actuate the master cylinder 42 to apply the vehicle brakes. Upon release of the brake pedal 14, the spring 48 will bias the assembly 44 and brake pedal 14 back to the position shown in FIG. 1.

When the tilt cylinder 16 is actuated, the rod eye 30 will rotate about the sleeve shown in the various embodiments of FIG. 2 or FIG. 3 or FIG. 4. This rotational movement will occur without any rotational movement of the cross pin 32. Thus, with the present invention, two loads, e.g., a brake pedal load and a tilt cylinder load, can be isolated from one another while mounting the brake pedal 14 and tilt cylinder 16 at one location of a frame 12.

Also, by extending the cross pin 32 outside the outboard side 12b of the frame 12, the master cylinder 42 can be conveniently mounted so as to permit easy access to it for any needed servicing or maintenance checks. In practice, this easy access can occur, for example, by providing the vehicle body (not shown) covering the frame 12 with a closeable opening (not shown) through which the cylinder 42 can be checked.

Other aspects, objects and advantages of this invention can be obtained from a study of the drawings, the disclosure and the appended claims.

I claim:

1. Apparatus (10) for mounting at least one tilt cylinder (16, 18, 30) and a brake pedal (14) for controlling a brake master cylinder (42), the apparatus (10) comprising:
   a frame (12) having an inboard side (12a) and an outboard side (12b);
   a bracket (20) mounted on the inboard side (12a) of the frame (12) and having a bifurcated end of first (24) and second (26) spaced apart hollow ears, the first ear (24) of the bracket (20) extending to the outboard side (12b) of the frame (12);
   an elongated sleeve (52 or 60 or 62) having first (52a or 60a or 62a) and second (52b or 60b or 62b) end portions and a mid-portion (52c or 60c or 62c), the first (52a or 60a or 62a) and second (52b or 60b or 62b) end portions of the sleeve (52 or 60 or 62) being supported on the frame (12) by the bracket (20);
   an elongated cross pin (32) extending within the sleeve (52 or 60 or 62) and the ears (24, 26) and having a first portion (32c), a second portion (32d) and a mid-portion (32e) intermediate the first (32c) and second (32d) portions, the sleeve (52 or 60 or 62) and the cross pin (32) being constructed to be spaced apart (58, 61, 68) at the mid-portions (52c or 60c or 60c and 32e) thereof, the tilt cylinder (16, 18, 30) being rotatably mounted on the sleeve mid-portion (52c or 60c or 62c) and the brake pedal (14) being fixedly coupled to the cross pin (32);
   means (38, 40, 44, 46) for coupling the cross pin (32) to the master cylinder (42); and
   means (34, 36) for coupling the brake pedal (14) to the cross pin (32).

2. Apparatus (10) according to claim 1 wherein the cross pin (32) includes a first end (32a) extending through the second ear (26) on the inboard side (12a) of the frame (12) and having the brake pedal (14) mounted thereon, and a second end (32b) extending through the first ear (24) to the outboard side (12b) of the frame (12).

3. Apparatus (10) according to claim 2 wherein the brake master cylinder (42) is mounted on the outboard side (12b) of the frame (12), and the means (38, 40, 44, 46) for coupling the pin (32) to the brake master cylinder (42) includes a sleeve (38) secured around the second end (32b) of the pin (32) and having an ear (40) depending therefrom, a piston and lever assembly (44) connected to the brake master cylinder (42), and a pin (46) coupling the assembly (44) to the depending ear (40).

4. Apparatus (10) according to claim 3 further including a bearing (54, 56) fixedly mounted within each of the first (52a) and second (52b) end portions of the elongated sleeve (52) respectively, each of said sleeve end portions (52a, 52b) and said bearings (54, 56) being fixedly and directly supported internally on the first (24) and second (26) hollow ears of the bracket (20) respectively, one (54) of the bearings rotatably supporting the first portion (32c) of the cross pin (32) and the other (56) of the bearings rotatably supporting the second portion (32d) of the cross pin (32).

5. Apparatus (10) according to claim 3 wherein the first (60a) and second (60b) ends of the sleeve (60) are wider than the sleeve mid-portion (60c) and are fixedly and directly supported internally on the first (24) and second (26) ears of the bracket (20) respectively, each of the sleeve ends (60a, 60b) rotatably supporting the first (32c) and second (32d) portions of the cross pin (32) respectively.

6. Apparatus (10) according to claim 3 wherein the first (62a) and second (62b) ends of the sleeve (62) are fixedly and directly supported internally on the first (24) and second (26) ears of the bracket (20) respectively, each of the ears (24, 26) further fixedly and directly supporting a bearing (64, 66) positioned internally therein adjacent the first (62a) and second (62b) sleeve ends respectively, each of the bearings (64, 66) having a thickness greater than the sleeve (62), one (64) of the bearings rotatably supporting the first portion (32c) of the cross pin (32) and the other (66) of the bearings rotatably supporting the second portion (32d) of the cross pin (32).

7. Apparatus (10) for supporting a first load member (16, 18, 30) and a second load member (14, 34, 36) comprising:
   a frame (12);
   a bracket (20) mounted on the frame (12) and having a bifurcated end of first (24) and second (26) spaced apart hollow ears;
   an elongated sleeve (52) having first (52a) and second (52b) end portions and a mid-portion (52c);
   first (54) and second (56) bearings fixedly mounted in the first (52a) and second (52b) sleeve end portions respectively, each of said sleeve end portions (52a, 52b) and said bearings (54, 56) being fixedly and directly supported internally on the first (24) and second (26) ears of the bracket (20) respectively; and
   an elongated cross pin (32) extending within the sleeve (52) and the ears (24, 26) and having a first portion (32c), a second portion (32d), and a mid-portion (32e) intermediate the first (32c) and second (32d) portions, the cross pin (32) being rotatably supported at the first pin portion (32c) by the first bearing (54) and at the second pin portion (32d) by the second bearing (56), the sleeve (52) and the cross pin (32) being constructed to be spaced apart (58) at the mid-portions (52c, 32e) thereof, the first load member (16, 18, 30) being rotatably coupled to the sleeve (52) at the sleeve mid-portion (52c), and the second load member (14, 34, 36) being fixedly coupled to the cross pin (32).

8. Apparatus (10) for supporting a first load member (16, 18, 30) and a second load member (14, 34, 36) comprising:
   a frame (12);
   a bracket (20) mounted on the frame (12) and having a bifurcated end of first (24) and second (26) spaced apart hollow ears;
   an elongated sleeve (60) having first (60a) and second (60b) end portions and a mid-portion (60c), the first (60a) and second (60b) sleeve end portions being wider than the sleeve mid-portion (60c) and being fixedly and directly supported internally on the first (24) and second (26) ears of the bracket (20) respectively; and
   an elongated cross pin (32) extending within the sleeve (60) and the ears (24, 26) and having a first portion (32c), a second portion (32d), and a mid-portion (32e) intermediate the first (32c) and second (32d) portions, the cross pin (32) being rotatably supported at said first pin portion (32c) by the first sleeve end portion (60a) and at the second pin portion (32d) by the second sleeve end portion (60b), the sleeve (60) and the cross pin (32) being constructed to be spaced apart (61) at the mid-portions (60c, 32e) thereof, the first load member (16, 18, 30) being rotatably coupled to the sleeve (60) at the sleeve mid-portion (60c), and the second load member (14, 34, 36) being fixedly coupled to the cross pin (32).

9. Apparatus (10) for supporting a first load member (16, 18, 30) and a second load member (14, 34, 36) comprising:
- a frame (12);
- a bracket (20) mounted on the frame (12) and having a bifurcated end of first (24) and second (26) spaced apart hollow ears;
- an elongated sleeve (62) having first (62a) and second (62b) end portions and a mid-portion (62c), each sleeve end portion (62a, 62b) being fixedly and directly supported internally on the first (24) and second (26) ears of the bracket (20);
- first (64) and second (66) bearings fixedly and directly supported internally on the first (24) and second (26) ears of the bracket (20) adjacent the first (62a) and second (62b) sleeve ends respectively, each of the bearings (64, 66) having a thickness greater than the sleeve (62); and
- an elongated cross pin (32) extending within the sleeve (62) and the ears (24, 26) and having a first portion (32c), second portion (32d), and a mid-portion (32e) intermediate the first (32c) and second (32d) portions, the cross pin (32) being rotatably supported at the first pin portion (32c) by the first bearing (64) and at the second pin portion (32d) by the second bearing (66), the sleeve (62) and the cross pin (32) being constructed to be spaced apart (68) at the mid-portions (62c, 32e) thereof, the first load member (16, 18, 30) being rotatably coupled to the sleeve (62) at the sleeve mid-portion (60c), and the second load member (14, 34, 36) being fixedly coupled to the cross pin (32).

* * * * *